Figure 1:
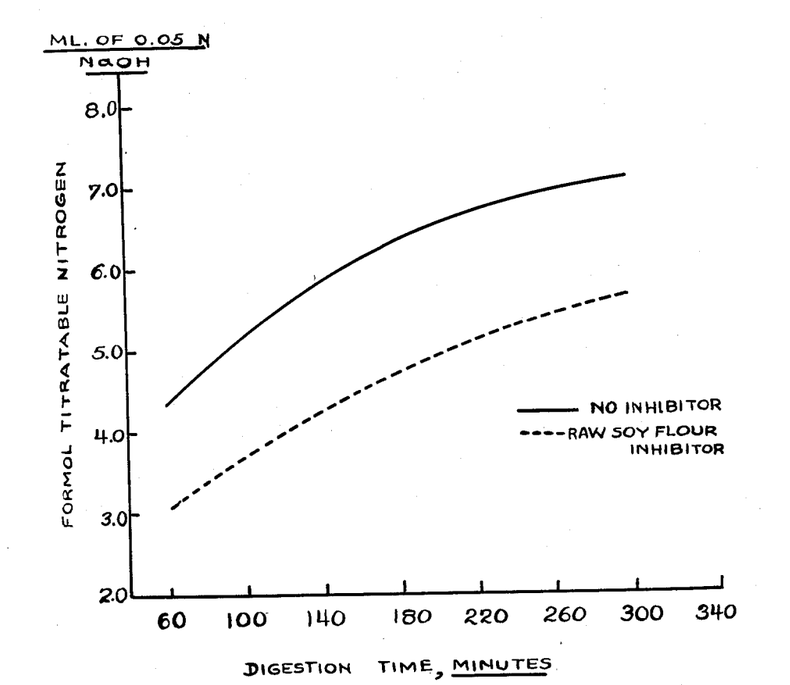

Feb. 23, 1954  D. MELNICK  2,670,291
PROTECTION OF FOOD AGAINST PROTEIN DEGRADATION
Filed Aug. 24, 1950

INVENTOR
Daniel Melnick
BY
W.J. Eccleston,
ATTORNEY

Patented Feb. 23, 1954

2,670,291

UNITED STATES PATENT OFFICE 2,670,291

PROTECTION OF FOOD AGAINST PROTEIN DEGRADATION

Daniel Melnick, West Englewood, N. J.

Application August 24, 1950, Serial No. 181,254

20 Claims. (Cl. 99—91)

(Granted under Title 35, U. S. Code (1952), sec. 266)

The invention described herein, if patented, may be manufactured and used by or for the Government for governmental purposes, without the payment to me of any royalty thereon.

This invention relates to the protection of food against deleterious changes caused by protein degradation, and more specifically to safe and effective means for protecting such food with a concentrate derived from an aqueous legume extract such as soybean extract, and to a method for preparing such a concentrate.

Many papers have appeared during the past twenty-eight years indicating that legumes, including soybean, and egg white contain factors which interfere with the enzymic digestibility of protein. These naturally-occurring antitryptic factors, or trypsin inhibitors, as they are called, have been held to be largely responsible for the interference in the biological utilization of the associated food protein. The anti-tryptic factors have been demonstrated to be destroyed or rendered inactive by heat, with a resulting increase in the biological value of the protein concomitantly ingested (Melnick, D., and Oser, B. L., The Influence of Heat-Processing on the Functional and Nutritive Properties of Protein, Food Technology, vol. 3, pp. 57–71 (1949)). In recent years great interest has been centered on the trypsin inhibitors in soybean, with the view toward destroying its activity. This is largely due to the fact that soybeans, which are low in cost, contain a high concentration of protein potentially of relatively high biological value, i. e., after proper heat-processing to render inactive the trypsin inhibitors present. Soybean meal (heat-processed) is one of the major components in poultry feed rations, and soybean flour after heat-processing is used to a very large extent for relief feedings in overseas areas since this food furnishes the greatest amount of high quality protein per unit cost. From the foregoing it is apparent that all studies up to the present have been concerned with measures to render inactive the trypsin inhibitors occurring in legumes, these factors being regarded as being only a liability in the food.

Despite the general antagonism to the presence of antitryptic factors in foods, I continued to search for some useful function for these factors. I have now discovered a way to utilize the antitryptic material naturally present in legumes, particularly soybeans; this is concerned with the prevention of deteriorative changes in foods due to protein degradation. I have found through extensive studies that there are numerous cases where proteolysis, due to enzymes naturally present in a given food or contributed by bacterial contamination, is responsible for unacceptable products or for a short shelf life of products; this particularly applies to baked goods, such as bread, yeast-raised cakes, and the like, though the applicability of my invention is not limited to baked goods. The naturally-occurring anti-tryptic factors are so called because they can be shown to inhibit trypsin digestion of proteins. However, I have discovered that only in the case of the trypsin inhibitor in egg white is this inhibition specific for the proteolytic enzyme trypsin; the trypsin inhibitors in leguminous products will inhibit other proteolytic enzymes as well and hence should be called anti-proteolytic rather than anti-tryptic.

It is therefore an object of the present invention to provide a process for protecting farinaceous food against deleterious changes caused by protein degradation, prior to final heat-processing. The heat-processing renders inactive the antiproteolytic complex so that it in no way interferes with the nutritional value of ingested protein.

A further object of my invention is the preparation of a concentrate of legume origin, particularly a concentrate derived from inexpensive soybean flour, which is substantially free from disagreeable taste and capable of improving baked goods and other food products to which it is added prior to final heat-processing.

Another object of my invention is a simple, inexpensive, and effective process for making such a concentrate.

Yet another object of my invention is the preservation of a dough composition containing ingredients normally responsible for deleterious proteolytic changes in the finished products, by a protective agent which inhibits such deleterious changes.

An additional object of my invention is the utilization of immature flour in dough products, in the presence of the above protective agent.

Still another object of my invention is the formulation of satisfactory doughs and baked products despite the inclusion of ingredients, such as wheat germ, low-heat processed milk, dried brewers' yeast, active dry bakers' yeast, the protein or gluten degradation being inhibited by including in the dough a concentrated legume, particularly soybean extract.

Further objects and advantages of the invention will appear from the following description:

I have found in my studies that legume concentrations, particularly soy concentrates, prepared in accordance with my methods about to be described, when added to doughs, inhibit gluten degradation because of the presence in the flour of proteinases or because of the direct action of the proteolytic enzyme systems derived from dead yeast cells, low-heated milk and wheat germ, or because of the presence in the latter supplementary ingredients of sulfhydril and other reducing compounds capable of activating the proteolytic system in flour or impairing gluten structure by some as yet unexplained direct action. The anti-tryptic complex in egg albumen has proved to be ineffective for this purpose. Regardless of which mechanism is truly responsible for gluten degradation in the presence of proteolytic enzymes, sulfhydril and other reducing compounds, the observation of primary importance is that the deteriorative changes are inhibited by my method.

While I do not desire to be bound by any particular theory concerning the reasons for the efficacy of my invention, I advance as a possible reason the view that gluten degradation occurs in doughs primarily as a result of the activation of the proteinases by the sulfhydril and other reducing compounds present, and that the legume extracts in accordance with the present disclosure counteract the potential activity of these proteinases.

Wherever in the ensuing detailed description and claims of my invention the term "antiproteolytic" is used, it means the property of retarding or inhibiting the degradation of protein, particularly prior to heat-processing; and conversely the term "non-antiproteolytic" means the absence of such property.

I have found that by adding to the dough or to the dough ingredients a legume (particularly soybean) fraction characterized by antiproteolytic activity, it is possible to inhibit the systems responsible for gluten degradation. I do not introduce unnatural compounds or reagents capable of precipitating toxic reactions per se or as a result of their effect on wheat flour components, but a fraction of a natural edible product which in no way adversely modifies the chemical composition of the flour or dough ingredients. This is superior to the employment of oxidizing agents, so-called bread improvers, or other added chemicals for improving the characteristics of the dough and of the resulting bread or other bakery products. A summation of the effects of the oxidizing agents added to each of the dough ingredients, potentially capable of promoting gluten degradation, may exceed the tolerance peak, thereby ruining the product. Furthermore, the requirements for oxidizing agents vary with the length and conditions of storage of the ingredients so that there is no assurance at a given time that an optimal concentration derived from these different sources is in the dough. Oxidizing agents also shorten the fermentation tolerance of the dough, i. e., the period of optimal maturity when the dough should be rolled into loaves. The antiproteolytic concentrate from soy is not subject to the above criticisms. Inadequate amounts of my concentrate are ineffective as a dough improver, as in the case of too small a concentration of the oxidizing agents. However, an excess in no way injures the flour or other dough ingredients, since a plateau in performance with no dropping off on increasing the concentration within wide limits occurs. Furthermore, the antiproteolytic supplement imparts to the dough an increase in fermentation tolerance over and above that obtained in the presence of bread improvers. In the heat-processing required to bake the bread, inactivation of the antiproteolytic complex is attained and this occurs after there is no further need for stabilization of the gluten protein.

Surprisingly, I found: (a) that the addition of unextracted leguminous material, such as raw soybean flour, to dough formulations, even in concentrations equivalent to the amount of antiproteolytic concentrates that would be added to the flour or dough in accordance with my invention, was unable to yield satisfactory doughs or breads when the doughs contained excessive amounts of proteolytic enzymes and reducing compounds; (b) that egg albumen was non-antiproteolytic and therefore ineffective for this purpose, and (c) that the objectionable taste characteristics of raw soy are eliminated when the soy concentrate is employed as the stabilizing agent. The extraneous materials in raw soy flour are deleterious in that they neutralize the beneficial effects to be derived from the antiproteolytic complex present. The anti-tryptic complex in egg albumen, as previously mentioned, is specific for trypsin and, therefore, exhibits no value in preventing gluten degradation in the dough. On the other hand, the antiproteolytic complex contained in legumes such as soybeans is not specific for trypsin, and for this reason is active in stabilizing gluten structure.

Specific illustrations are given below describing the preparation of active antiproteolytic concentrates and demonstrating their ability to prevent impairment of gluten structure in doughs containing proteolytic enzymes and sulfhydril and other reducing compounds.

EXAMPLE 1

One part of solvent-extracted raw soybean flour (Nutrisoy XXX, obtained from the Archer-Daniels-Midland Co., Chicago, Ill.) is suspended with mechanical stirring in 5 parts of pure water. For optimum extraction, it is desirable to adjust the pH of the suspension to about 6.7; however, a pH range between 4.5 and 8.5 may be employed in preparing the aqueous extract.

The extraction is allowed to proceed for about 30 minutes at about 20° C., and the insoluble residue is separated by suitable means, e. g., centrifugation. The extract is then acidified with a non-toxic acid, e. g., concentrated acetic acid or 38% hydrochloric acid, to a pH value at or near the isoelectric point of the protein, which is about 4.2; the pH value of the acidified extract may vary, however, from about 3.8 to 5, which is the plateau of maximum precipitation of non-antiproteolytic soybean protein.

Precipitation of a curd takes place at this pH level, and is aided by holding the extract at a moderately refrigerated temperature, e. g., 5° C., for several hours. Thereupon the supernatant liquid is siphoned off, and the remaining curd is subjected to centrifugation or filtration or equivalent procedures, to remove antiproteolytic liquid occluded therein. The residue remaining after centrifugation or filtration is a water-soluble heat-coagulable protein product whose functional properties are comparable to egg albumen, and which is usable as a substitute for egg albumen, e. g. in meringue powders, and in confectionery products.

The supernatant antiproteolytic liquid and the antiproteolytic liquid removed from the curd are then further concentrated, either separately or preferably jointly, to yield an antiproteolytic concentrate in powder form. The concentrate may, for instance, be accomplished by lyophilization (freezing the liquid and drying it at greatly reduced pressures, e. g., 2 mm. of mercury) or by spray-drying. In the case of spray-drying, a drying temperature of 65° C. should not be exceeded, because above that temperature a material lessening of the antiproteolytic functions of the concentrate takes place.

The antiproteolytic concentrate prepared in accordance with the above example was measured for its anti-tryptic activity and was found to possess approximately twice the anti-tryptic activity of the original raw soy flour; the assay was carried out in accordance with the method described in the article by Melnick and Oser, Food Technology, vol. 3, pp. 57–71 (1949), "The Influence of Heat-Processing on the Functional and Nutritive Properties of Protein," and by the method outlined hereinafter. However, as pointed out above, it is not possible to substitute raw soybean flour for my concentrate in dough formulations, even in twice the amount of the concentrate, because the irrelevant materials (particularly the crude fiber) in raw soybean flour adversely affect the quality of the dough and thereby negate the beneficial effects to be expected from the antiproteolytic complex furnished. Furthermore, a disagreeable taste is imparted by such a relatively large portion of soybean flour.

The concentrated powder prepared in accordance with the above example is slightly hygroscopic and thus has a tendency to clump under ordinary storage conditions; this tendency can be easily counteracted by the addition of starch or other suitable filler material before or after drying.

EXAMPLE 2

The procedure of Example 1 is repeated, using however, a solids to solvent ratio between soybean flour and water of 1:12.5, extending the time of the extraction to 60 minutes at a temperature of 50° C., and diluting the extract with an equal volume of water prior to isoelectric precipitation of the irrelevant soy proteins. The resulting lyophilized or spray-dried end products possess twice the antiproteolytic activity as the end product of Example 1, or four times that of the original raw soybean flour.

EXAMPLE 3

A soybean extraction is prepared as follows:
One part of solvent-extracted raw soy flour (Nutrisoy XXX, obtained from the Archer-Daniels-Midland Co., Chicago, Ill.) is suspended in 5 parts of water. The pH is adjusted to 6.5–7.0 with 40% sodium hydroxide solution. The extraction is allowed to proceed for a period of 30 minutes at 20° C., and the insoluble material allowed to settle. The supernatant solution is decanted into a glass-lined or stainless steel container. The extraction with 5 additional parts of water is repeated and the second extract added to the first. Three washings of the insoluble residue, each with one part of water, are made and the washings added to the extracts until a volume of 10 parts is obtained. (The sludge retains the remaining parts of water.) By this method of preparation, the antiproteolytic activity of 10 ml. of the pooled extracts and washings is equal to that of 1 gm. of the original soy flour. Although the extract contains irrelevant proteins, it is free from crude fiber and other undesirable materials and hence retains its effectiveness.

Instead of concentrating this extraction to dryness, the aqueous solution of the antiproteolytic complex may be used as such, in lieu of a corresponding quantity of water in preparation of the dough (see Example 6, below).

Other legumes, such as ground dried black-eyed peas or lima beans, the latter being a typical member of the genus phaseolus (phaseolus lunatus), processed in accordance with Examples 1–3 likewise yield antiproteolytic complexes. Solids to solvents ratio between legume (soybean, peas, beans, etc.) and water of from 1:5 to 1:15 were found operative. Extraction temperatures up to about 80° C. may be utilized, although I generally prefer 50° C. since the curd by-product then retains its functional properties (potein not denatured), and a maximal extraction of the antiproteolytic complex is attained. Likewise, the time of extraction may widely vary, e. g., from 30 to 60 minutes, the shorter time of extraction being generally preferred when the ratio of solids to solvent is 1:12.5 (see Loska, S. J., Jr., and Melnick, D., Cereal Chemistry, vol. 27, pp. 127–140 (1950)).

The following table summarizes various isolation procedures for the production of antiproteolytic complexes in accordance with my method, following the general procedure of Example 1, but varied as indicated below:

*Table I*

| | Extraction | | | Ppt. of First Protein Fraction, Dilution | Drying of Protein Fractions | |
|---|---|---|---|---|---|---|
| Method | Temp., °C. | Solids: Solvent, Ratio | Period, Min. | | First (Curd) | Second (Antiproteolytic) |
| 1 | 20 | 1:5 | 30 | None | Spray-dried | Lyophilized. |
| 2 | 20 | 1:5 | 30 | do | do | Spray-dried. Vacuum drum-dried. |
| 3 | 50 | 1:12.5 | 60 | 1-2 (1+1) | do | Spray dried. Vacuum drum-dried. |
| 4 | 80 | 1:12.5 | 30 | 1-2 (1+1) | do | Spray-dried. Vacuum drum-dried. |
| 5 | 20 | 1:12.5 | 60 | No precipitation | Entire extract spray or vacuum drum-dried. | |
| 6 | 50 | 1:12.5 | 60 | do | Do. | |

The extraction can be coupled with the precipitation of the first protein fraction by conducting the extraction at pH 4.2. However, such a procedure does not permit the isolation of the first protein fraction free of irrelevant materials in soy.

In all cases the materials were dried at a temperature less than 65° C. In order to minimize heat denaturation of the antiproteolytic complex, the extracts were first adjusted to the pH of the initial extract (6.7).

The curds were homogenized with one part of added water and then spray-dried.

In methods 5 and 6, the extracts containing both the antiproteolytic fraction and other soy proteins are dried directly without separating the two components.

The antiproteolytic potency of the extracts prepared by the foregoing methods may be determined by a modification of the procedure described by Westfall and Hauge in Journal of Nutrition, vol. 35, pp. 379–389, 1948. The measurement is based on the ability of the antiproteolytic factor of soy flour (or other legume flour) to retard the pancreatic digestion of casein in vitro.

It was found that the addition of an extract, obtained following exhaustive aqueous extraction of 1 part of raw soy flour, to a system containing 4 parts of U. S. P. pancreatin and 40 parts of casein was capable of reducing the proteolytic activity of the pancreatin by over 50%. It was further found that the concentration of antiproteolytic complex had little effect on modifying the degree of inhibition of the proteolytic activity of the system. The above findings are the same regardless whether the extract derived from 1 part of raw soy flour is added in a given volume in 1% or in twice that volume in 0.5% concentration (the latter expressed in terms of the initial raw soy flour).

Preferably, the antiproteolytic activity of a legume concentrate or solution prepared in accordance with Examples 1–3, above, may be measured by comparing its antiproteolytic effect on a pancreatin-casein system with that of a proportionate amount of raw soy flour inhibitor. Thus, if ½ part (on a dry weight basis) of a concentrate prepared in accordance with Example 1 inhibits proteolysis in the foregoing pancreatin-casein system to the same extent as 1 part of raw soy flour (on a dry weight basis), the antiproteolytic activity of the former may be stated to be 2 times that of the latter.

Objective measurement of proteolytic digestion occurring in a pancreatin-casein system is carried out by formol titration of liberated amino nitrogen (amino acids) evolved as the result of digestive hydrolysis of the protein in the test sample; the formol-titration procedure is described in an article by Melnick and Oser, Food Technology, vol. 3, pp. 57–71 (1949). Correction must be made for the titration of the phosphate and other buffers and for the initial formol titratable amino nitrogen contributed by the inhibitor preparation (e. g. soy flour), the protein substrate (casein), and the proteolytic agent (pancreatin) themselves. Correction is also made for the formol titratable nitrogen liberated during the digestion period from proteins other than the casein, i. e. from protein in the inhibitor preparation and in the pancreatin. The following table shows the amount (corrected as indicated above) of formol titratable nitrogen liberated during the digestion of the casein, when 10 ml. portions of a test system consisting of 20 ml. of .5% U. S. P. pancreatin, 25 ml. of a 4% casein solution, and 5 ml. of an inhibitor solution or suspension, such as a .5% aqueous suspension of raw soy flour, are periodically titrated; the overall solvent or suspending medium in the test system is 0.0125 M phosphate buffer solution (pH 8.3). A similar test system but containing, in place of the inhibitor solution or suspension, 5 ml. of the phosphate buffer, is likewise tested.

Table II

[Formol-titratable nitrogen (in ml. of .05 N NaOH per 10 ml. portion test system).]

| Digestion Time, Minutes | Inhibitor Absent | Inhibitor Present |
|---|---|---|
| 60 | 4.37 | 3.06 |
| 180 | 6.34 | 4.74 |
| 300 | 7.10 | 5.64 |

The appended drawings plot these values in the form of curves.

Expressing the rate of digestive hydrolytic decomposition of the test sample otherwise, the following table shows the digestion time needed to produce a given quantity (corrected) of formol titratable nitrogen in the foregoing test samples:

Table III

| Titratable amino nitrogen (as ml. of .05 N NaOH per 10 ml. of test sample) | Time of Digestion (in min.) | | |
|---|---|---|---|
| | A Inhibitor Absent | B Inhibitor Present | C Ratio Col. A/Col. B |
| 4.5 | 67 | 158 | .42 |
| 5.0 | 90 | 207 | .44 |
| 5.5 | 118 | 274 | .43 |

The above values read on the curves shown in the drawing.

Table III shows that A/B is substantially a constant of the value of about .43; i. e. without an inhibitor, a degree of proteolytic digestion of the casein is reached in 43% of the time needed to produce the same degree of hydrolysis in the presence of the above inhibitor preparation.

Enzyme activity is measured according to the inverse time-enzyme relationship, i. e. the reciprocal of the time required to decompose a fixed quantity of the substrate, casein in this case (Van Slyke, D. D., Advances in Enzymology, vol. 2, pp. 33–47, 1942; Bull, H. B., Physical Biochemistry, John Wiley & Sons, Inc., p. 42, 1947). Inhibition is expressed as the ratio of the difference between the inverse time values obtained for the uninhibited system and for the inhibited system to the inverse time value obtained for the uninhibited system.

$\dfrac{1}{t_u}$ = inverse time required by uninhibited system to decompose a fixed quantity of substrate $\dfrac{1}{t_i}$ = inverse time required by inhibited systeom t decompose the same quantity of substrate then $$\dfrac{\dfrac{1}{t_u}-\dfrac{1}{t_i}}{\dfrac{1}{t_u}} \times 100 = \text{per cent inhibition}$$

In the example given herein $$\dfrac{\dfrac{1}{.43}-\dfrac{1}{1.00}}{\dfrac{1}{.43}} \times 100 = 57\% \text{ inhibition of casein digestion}$$

For purposes of simplification:

$$\dfrac{\dfrac{1}{t_u}-\dfrac{1}{t_i}}{\dfrac{1}{t_u}} \times 100 = \left(\dfrac{1}{t_u}-\dfrac{1}{t_i}\right)t_u \times 100 = 100 - \dfrac{100 t_u}{t_i}$$

and in the example given:

100 − 43 = 57% inhibition of casein digestion

The foregoing illustration of the antiproteolytic activity of an aqueous extract or suspension of raw soy flour on a casein-pancreatin system furnishes an objective method for determining the antiproteolytic activities of any inhibitor system; thus, 12.5 mg. (dry wt.) of an inhibitor prepared according to Example I was found to inhibit proteolytic decomposition of the casein in the test system to the same extent as 25 mg. (dry wt.) of the initial raw soy flour; the inhibitor preparation possesses antiproteolytic activity 2 times that of the raw soy flour.

The antiproteolytic complex which is present in soy flour and other legume flour, may be largely destroyed by severe heating; thus, I have found by the above-described test method that the antiproteolytic activity of an inhibitor derived from severely-preheated soy flour is only ¼ of that of an inhibitor derived from the same quantity of non-preheated soy flour.

EXAMPLE 4

This example illustrates the effectiveness of the the antiproteolytic complex of a leguminous product (e. g. soybean) in preventing gluten degradation attributable to the proteinases and to the sulfhydril and other reducing compounds naturally present in flour and contributed by dough adjuncts, viz. active dry bakers' yeast, low heat-processed milk, and dry brewers' yeast. In this particular example, dry brewers' yeast, furnishing proteolytic enzymes and sulfhydril and other reducing compounds in greater concentrations than the other dough adjuncts, was added to affect adversely gluten structure.

The basic formula of the doughs was as follows:

| | Parts |
|---|---|
| Flour (short-patent; 10.5% protein and 0.4% ash) calculated to a 14% moisture content | 100 |
| Yeast (compressed bakers') | 2 |
| Sugar (sucrose) | 6 |
| Shortening (hydrogenated vegetable oil) | 6 |
| Milk solids (non-fat; heat-processed) | 6 |
| Salt (sodium chloride) | 2 |
| Water | 64 |

Several modifications of the basic dough formula were made as hereafter indicated. The basic (or control) dough and modified doughs were prepared and processed as follows:

The yeast was suspended in approximately one-fourth of the required volume of water at 88° F. The flour was then added, followed by the remaining water, and finally by a blended mixture consisting of the sugar, shortening, milk solids and salt. The ingredients were blended in a mechanical mixer at low speed for four minutes; and then at high speed for two minutes longer. The temperature of the dough, after mixing, was 80° F. The dough was transferred to a fermentation bowl and held in the fermentation cabinet at 86° F. and 84% relative humidity for a period of two hours and ten minutes. The dough was punched and returned to the cabinet for an additional 25 minutes. The dough pieces (21.5 ounces in the case of the control batches) were passed through a standard molding machine and placed in lightly-greased bread-baking pans. The loaves were held in the proofing cabinet at 98° F. and 95% relative humidity for a period of one hour. The loaves were then baked in an oven at 425° F. for a period of 30 minutes. In the formulation of the modified doughs, some extra water was added as the case required, to obtain the same dough consistency. The dough pieces from the modified batches all contained the same quantities of the common ingredients listed above. The quality of all breads obtained was evaluated independently by two experienced baking technologists. All doughs were prepared in duplicate and the reproducibility in the characteristics of the doughs and baked items was excellent.

(a) Control bake

The breads obtained from the basic dough measured on the average 2830 ml. per 21.5 oz. of dough. To this volume was arbitrarily assigned a score of 100. The control breads exhibited excellent break and shred, grain and texture, crumb color and flavor. To each of these characteristics a value of 100 was also assigned. Crust color was uniform and excellent in quality.

(b) Basic dough supplemented with brewers' yeast

The basic dough was modified by the inclusion of 3% of dry brewers' yeast (based on the weight of the flour); brewers' yeast being known in the art as an ingredient contributing to poor gluten structure, presumably due to its contribution of proteolytic enzymes and sulfhydril and other reducing compounds. The dough was very sticky and therefore difficult to handle. The breads baked from the dough were poor; they had a volume score of 84 (i. e. 84% of the volume of the control bake); break and shred characteristics were rated 0; grain and texture rated 85, crumb color 80, flavor 90.

(c) Basic dough supplemented with brewers' yeast and with an antiproteolytic legume concentrate To the dough ingredients of Example 4(b) (dough including 3% dry brewers' yeast) were added 5 parts by weight (per 100 parts by weight of flour) of an antiproteolytic dry soy bean concentrate prepared in accordance with Example 1 and having twice the antiproteolytic activity of raw soy flour. The dough handled as well as that used in the control bake, described above. The breads baked therefrom had a volume score of 96; break and shred rating was 90, grain and texture 100, crumb color 85, flavor 90. The quality of the bread was thus comparable to the control bake (without brewers' yeast), and the adverse effect of the brewers' yeast was substantially overcome by the antiproteolytic complex. The lower crumb color and flavor of these breads when compared to the control bake, are attributable to the brewers' yeast supplement. The antiproteolytic soy bean concentrate cannot reverse adverse color or flavor imparted by dough ingredients; it is specific in preventing gluten degradation in doughs when certain ingredients having the capacity of promoting such undesirable changes are included in the dough formulation.

(d) Basic dough supplemented with brewers' yeast and with soy flour

Instead of an antiproteolytic soybean concentrate, 10 parts by weight (per 100 parts by weight of flour) of defatted dry raw soy flour were added to the dough of Example 4(b). Even though the antiproteolytic activity of 10 parts of raw soy flour was the equal of 5 parts of the soy flour concentrate having twice the antiproteolytic activity, the results were unfavorable. The dough was sticky, and the breads obtained therefrom were even worse, in some respects, than the bread prepared from the basic dough containing added brewers' yeast (Example 4(b)). The volume of the bread scored 84; break and shred rating 0, grain and texture 80, crumb color 70, flavor 60. When using 10 parts of bakers' soy flour (mildly heat-processed) instead of raw soy flour, the resulting bread was even worse: Volume score 68, break and shred 0, grain and texture 25, crumb color 65, flavor 60.

(e) *Basic dough supplemented with brewers' yeast and with egg white solids*

In an attempt to evaluate the potential antiproteolytic activity of egg white solids, 2½ parts by weight of unheated egg white solids per 100 parts by weight of flour were added to the dough components of Example 4(b) containing 3% dry brewers' yeast. No improvement over the dough of Example 4(b) was noted. The dough was very sticky; volume of the bread scored 84, break and shred rating 0, grain and texture 85, crumb color 75, flavor 90.

It will be noted from the preceding ratings that gluten degradation occurs when the material (brewers' yeast) added to the dough furnishes proteinases and sulfhydril and other reducing compounds. The dough is sticky and difficult to handle. The bread exhibits low volume; break and shred are absent; and grain and texture are inferior. Supplementation of the ingredients with the antiproteolytical concentrate from soy flour yields a dough and ultimately a bread almost indistinguishable from the control.

The supplementation of the ingredients with raw soy flour to yield a dough equal in antitryptic activity to that containing the soy concentrate is also ineffective (see Example 4(d)). This has been interpreted to indicate that the irrelevant materials in raw soy flour adversely affect the quality of the dough and thereby negate the beneficial effects to be expected from the antiproteolytic complex furnished.

Crumb color and flavor are somewhat impaired by the inclusion of the brewers' yeast in the dough formulations. Improvement in these characteristics is not attained by supplementation of the ingredients with the antiproteolytic concentrate from soy flour. Of importance is the observation that these characteristics are adversely affected when raw or bakers' (mildly heat-processed) soy flour is included in the dough formulations. In other words, the antiproteolytic concentrate, capable of negating the harmful effects attributable to excessive concentration of sulfhydril and other reducing compounds and to excessive proteolysis, does not furnish the components of soy flour responsible for the undesirable taste and color characteristics imparted to the breads.

The antiproteolytic complex in the spray-dried egg white supplement was found to be completely ineffective in protecting the gluten protein in the doughs from degradation due to the proteases, sulfhydril and other reducing compounds added by way of the brewers' yeast supplement. The egg white product, when assayed for anti-tryptic activity using either method of test heretofore cited or outlined, was on a dry weight basis actually twice as rich in anti-tryptic activity as the antiproteolytic soy concentrate used in Example 4(c). The discovery that the anti-tryptic complex in leguminous products prevents gluten degradation in a system containing no trypsin whereas the anti-tryptic complex in egg white is completely ineffective in such systems justifies the conclusion that in leguminous products the complex is antiproteolytic, while in egg white it is specifically anti-tryptic and hence not effective.

EXAMPLE 5

This example illustrates effectiveness of the antiproteolytic complex of a leguminous product, e. g. soybean, in preventing gluten degradation attributable to excessive concentrations of proteinases and of sulfhydril and other reducing compounds naturally present in wheat flour. These undesirable components of wheat flour are found in highest concentration in the wheat germ and to a much lesser extent in the endosperm. The presence of the wheat germ in whole wheat flour is responsible in large measure for the poor baking performance of whole wheat flour. Freshly milled (immature) white flour and sprouted (or malted) wheat flour contain sufficient concentrations of the undesirable components to interfere with baking performance because of gluten degradation. Even the small concentrations of these undesirable factors in a properly matured flour can be detrimental if the doughs are held (in the refrigerator) for a sufficient period of time. In this particular example wheat germ, rich in proteolytic enzymes and containing appreciable quantities of sulfhydril compounds, was included in the dough formulations. Ordinarily, in the manufacture of wheat germ-fortified breads, the introduction of wheat germ into the formulations gives rise to sticky doughs and to an unsatisfactory loaf of bread.

The basic formula of the doughs and the method of bread manufacture were the same as given in Example 4.

(a) *Control bake*

See Example 4(a).

(b) *Basic dough supplemented with wheat germ*

4% (based on the weight of flour) of unheated wheat germ were added to the dough components of the control bake. The dough was sticky and difficult to handle; the volume of the breads scored 86 (i. e. 86% of the volume of control bake), break and shred characteristics rated 0, grain and texture 85, crumb color 85, and flavor 90.

(c) *Basic dough supplemented with wheat germ and with an antiproteolytic legume concentrate*

Five parts by weight of antiproteolytic dry soybean concentrate prepared in accordance with Example 1, and having twice the antiproteolytic activity of raw soy flour were added to the dough components of Example 5(b) containing 4% wheat germ. The dough handled as well as that used in the control bake. The volume of the bread baked therefrom scored 98, break and shred rating 100, grain and texture 100, crumb color 90, flavor 90. The bread from a dough containing both wheat germ and antiproteolytic complex was thus about equal to the control bake (without wheat germ).

(d) *Basic dough supplemented with wheat germ and with soy flour*

Instead of a soy concentrate, 10% (based on the weight of flour component of the dough) of defatted raw soy flour were added to the dough components of Example 5(b). The result was on the whole less favorable than if no soy flour at all had been added; the dough was sticky, the volume of the breads scored 89, break and shred characteristics rated 0, grain and texture 50, crumb color 75, flavor 60. With bakers' soy flour (mildly heat-processed) in lieu of raw soy flour, the bread was still worse: Volume 71, break and shred 0, grain and texture 25, crumb color 70, flavor 60.

(e) *Basic dough supplemented with wheat germ and with egg white solids*

2½% (based on the weight of dry flour) of egg white solids were added to the dough components of Example 5(b) containing 4% wheat germ. Again, the result was no improvement over 5(b): The dough was sticky; volume of the bread scored 86; break and shred characteristics 0, grain and texture 90, crumb color 85, flavor 90.

It will be noted from the results presented that the same general picture is obtained when the tests described under Examples 4 and 5 are carried out. The interpretation and conclusions drawn in Example 4 are equally applicable to Example 5. Similar results are obtained when the same experimental approach is employed in a study of the usefulness of supplementing dough ingredients with the antiproteolytic complex in order to permit in bread manufacture the use of immature flour, of active dry bakers' yeast that had undergone deteriorative changes during processing and storage, and of mildly-heated skim milk solids (functional properties of the protein unimpaired).

EXAMPLE 6

Instead of adding the antiproteolytic soybean extract in the form of a dry concentrate, I have found that it may also be added in solution form and with irrelevant soy proteins present. This is in contrast to my findings, as exemplified in Examples 4(c) and 5(c) that whole raw soy flour fails to improve the gluten structure of the dough or of the bread obtained therefrom. However, a certain minimum amount of the antiproteolytic complex must be added.

(a) *Basic dough supplemented with brewers' yeast and an adequate amount of soy flour extract*

To the components of the dough of Example 4(b) (containing 3% dry brewers' yeast) were added, in lieu of the 64 parts of water, 64 parts of an aqueous soy flour extract prepared in accordance with Example 3. As stated in the latter example, 10 ml. of the solution have an antiproteolytic activity equal to that of 1 gram of the original raw soy flour; thus, the 64 parts of aqueous solution are theoretically equal in antiproteolytic activity to 6.4 parts of raw soy flour. The dough consistency was satisfactory; the bread baked therefrom had a volume score of 95 (i. e. 95% of that of the control bake), a break and shred rating of 90, a grain and texture rating of 100, crumb color rating of 85 and flavor rating of 90.

(b) *Basic dough supplemented with brewers' yeast and a borderline amount of soy flour extract*

The procedure of Example 6(a) was repeated, except that the liquid components of the dough, per 100 parts of flour, were 14 parts water and 50 parts of the antiproteolytic solution of Example 3. As previously explained, 50 parts by weight of such a solution correspond in antiproteolytic activity to 5 parts by weight of raw soy flour. The dough, thus prepared, was satisfactory in consistency. The volume of the bread scored 93, break and shred rating 80, grain and texture 100, crumb color 85, flavor 90.

(c) *Basic dough supplemented with brewers' yeast and an inadequate amount of soy flour extract*

The test of Example 6(a) was repeated with 24 parts (per 100 parts of flour) of water and 40 parts of the antiproteolytic solution of Example 3, corresponding to the antiproteolytic activity of 4 parts by weight of raw soy flour. The dough was slightly sticky. The volume of the bread scored only 80, break and shred characteristics rated 0, grain and texture 85, crumb color 85, flavor 90. The same results were obtained by the employment of 34 parts of water and 30 parts of the antiproteolytic solution of Example 3 (corresponding to the antiproteolytic activity of 3 parts of raw soy flour), except that the dough was very sticky and the crumb color rating was only 80.

It will be noted from the preceding results of Example 6 that if an antiproteolytic solution of legume origin is used in place of some or all of the water constituents of the dough, the result is a bread almost undistinguishable from the control bake, even if the dough contains an unfavorable proteolytic ingredient, such as dry brewers' yeast. However, there is a minimal concentration of the antiproteolytic complex for negating the effects of proteinases, sulfhydril and other reducing compounds in doughs. Thus, the addition of the antiproteolytic complex in concentration equivalent to that obtainable if 3 parts of the original soy flour had been added to 100 parts of the wheat flour is without effect in negating the deleterious activity of the brewers' yeast supplement. Incorporation of the antiproteolytic complex in the dough at a level equivalent to 4 parts of the original soy flour, improves slightly the handling characteristics of the dough but no improvement in the end-item (the bread) occurs. The minimal effective antiproteolytic concentration in the dough is equivalent to that obtainable if 5 parts of the original soy flour had been added to 100 parts of the wheat flour. However, it is essential to add the antiproteolytic complex to dough formulations free from the water-insoluble portion of the original soy flour since the water-insoluble fraction (crude fiber) is an undesirable dough ingredient. There are, however, no objections to the irrelevant water-soluble soy proteins in solution along with the antiproteolytic complex when the latter is used to prevent gluten degradation in doughs.

I believe that the optimum concentration of antiproteolytic complex of legume origin in a farinaceous dough is obtained when enough antiproteolytic complex is added to provide antiproteolytic action equivalent to that of about 10 parts by weight of raw soy flour per 100 parts by weight of flour; for reasons of cost and baking technique, it is not ordinarily desirable to go beyond the equivalent of about 15 parts, however, and the minimum concentration, as pointed out above, is the equivalent of 5 parts in order to accomplish satisfactory results in the baked end product. If the antiproteolytic extract is of soybean origin, the measurements are relatively simple, provided the antiproteolytic concentrate or solution has been previously assayed in terms of its antiproteolytic activity compared with that of raw soy flour; thus, an addition of 5 parts of an antiproteolytic concentrate having 1½ times the antiproteolytic activity of raw soy flour is the equivalent of the antiproteolytic activity of 7½ parts of raw soy flour, and the addition of 5 parts of a concentrate having twice the antiproteolytic activity of raw soy flour is the equivalent of the antiproteolytic activity of 10 parts of raw soy flour. The same holds true if the antiproteolytic complex is added in the form of a solution, as set forth in Example 6. Thus, if 50 parts of an aqueous extract of raw soy flour, prepared in accordance with Example 3 and 10 ml. of which are found on assay to have an antiproteolytic activity equivalent to that of 1 gm. of raw soy flour, are added to 100 parts of flour to make a dough, the dough contains an antiproteolytic complex whose activity is equivalent to that of 5 parts of raw soy flour; and if the assay of an extract free of irrelevant soy proteins indicates that 10 ml. of solution are equivalent in antiproteolytic activity to 3 gm. of raw soy flour, then the addition of 50 parts of solution to 100 parts of flour results in a dough containing an antiproteolytic complex whose activity is equivalent to that of 15 parts of raw soy flour.

It will be understood, of course, that legume extracts and concentrates of non-soy origin can be assayed in the same manner as soy extracts and concentrates, as is more fully explained in this specification. Their addition to the dough components is measured in accordance with the same principles as set forth in the preceding paragraph, in order that the dough may contain the antiproteolytic complex in the desired concentration.

For ease of dough blending and to facilitate merchandising, it is preferable to blend the antiproteolytic complex with certain dough ingredients, viz. flour or wheat germ, and to store and merchandise the blend as a unit. In the case of other products which require drying under mild temperatures, viz. active dry bakers' yeast, low-heat processed dry skim milk solids, or dry brewers' yeast, the legume extract is added to the initial suspension or solution and then the blend dried to the desirable moisture level. It is, of course, desirable that such blends be properly labeled to indicate the strength of the antiproteolytic complex contained therein.

I further found that the inclusion of an antiproteolytic complex of legume origin, in the amounts set forth in this specification, counteracts the acceleration of proteolytic degradation of the dough caused by the inclusion of freshly milled (immature) wheat and/or sprouted or malted wheat flour.

Likewise, gluten degradation in "old" doughs, and particularly in refrigerated doughs is materially retarded by the inclusion of an antiproteolytic complex in accordance with the present invention. The keeping of doughs under refrigeration is sometimes necessary in small bake shops in order to compensate for the peaks and valleys in production. However, heretofore, the baked products obtained from refrigerated doughs (e. g. from doughs kept at 40° F. for 24-36 hours) were often inferior to those obtained from a freshly made and properly matured dough. This inferiority is postulated to be caused by slow but progressive protein degradation during the refrigeration period, and is successfully counteracted by the inclusion of my antiproteolytic complex in the dough, prior to being placed in the refrigerator. I have further found that the inclusion of an antiproteolytic complex (in the form of a dry concentrate or in solution) in dough, in minimum concentration equivalent to the antiproteolytic activity of 5 parts of raw soy flour per 100 parts of flour, yields a dough from which bread and other bakery products may be prepared after 36 hours of dough refrigeration; the products are indistinguishable in volume, color, grain and texture, and flavor from products made from freshly prepared and properly matured (according to regular commercial practice) doughs.

Although in the foregoing specification I have given various examples of my invention and have suggested certain modifications and alternatives, these are not intended to be exhaustive nor limiting of my invention, but on the contrary are selected and presented with a view to illustrating and explaining the invention, the principles thereof, and the manner of applying it in practical use in order that others skilled in the art may be enabled to practice the invention and apply it under various circumstances and in various ways, and with modifications, each as may be best suited to the conditions of a particular use. I therefore intend to limit the scope of my invention only by the appended claims.

I claim:

1. The method according to claim 2 of retarding protein degradation in a heat-processed farinaceous food product made from a dough, said method including the steps, subsequent to adding said legume extract to said dough, of refrigerating the dough, and baking the dough, whereby protein degradation in said product is materially reduced.

2. The method of retarding protein degradation in heat-processed farinaceous food made from a dough, comprising including in said dough, prior to final heat-processing, an antiproteolytic aqueous extract of a legume being a member of the group consisting of soya and phaseolus, from which a protein fraction has been removed by precipitation at a pH between about 3.8 and about 5, said legume extract being free from crude legume fiber, and being added in an amount, per 100 weight units of the flour component of said dough, equivalent in antiproteolytic activity to that of at least 5 weight units of raw soy flour.

3. The method according to claim 2, wherein a low-heat-processed milk product is included in said dough.

4. The method of retarding protein degradation in heat-processed farinaceous food made from a dough, comprising including in said dough, prior to final heat-processing, a concentrate of an antiproteolytic aqueous extract of a legume being a member of the group consisting of soya and phaseolus, from which a protein fraction has been removed by precipitation at a pH between about 3.8 and about 5, said legume extract being free from crude legume fiber, and said concentrate being added in an amount, per 100 weight units of the flour component of said dough, equivalent in antiproteolytic activity to that of at least 5 weight units of raw soy flour, the antiproteolytic activity of 1 gram of said concentrate on a dry weight basis being at least equal to the antiproteolytic activity of 1.5 grams of raw soy flour.

5. The method of retarding protein degradation in heat-processed farinaceous food made from a dough, comprising including in said dough, prior to final heat-processing, an antiproteolytic aqueous extract of a legume being a member of the group consisting of soya and phaseolus, from which a protein fraction has been removed by isoelectric precipitation, said soybean extract being free from crude soybean fiber, and being added in an amount, per 100 weight units of the flour component of said dough, equivalent in antiproteolytic activity to that of at least 5 weight units of raw soy flour.

6. The method of retarding protein degradation in heat-processed farinaceous food made a dough, comprising including in said dough, prior to final heat-processing, an antiproteolytic aqueous soybean extract from which a protein fraction has been removed by precipitation at a pH between about 3.8 and about 5, said legume extract being free from crude legume fiber, and being added in an amount, per 100 weight units of the flour component of said dough, equivalent in antiproteolytic activity to that of at least 5 weight units of raw soy flour.

7. A farinaceous dough, and in combination therewith, an antiproteolytic aqueous extract of a legume being a member of the group consisting of soya and phaseolus, from which a protein fraction has been removed by precipitation at a pH between about 3.8 and about 5, said legume extract being free from crude legume fiber, and said extract being present in an amount, per 100 weight units of the flour component of said dough, equivalent in antiproteolytic activity to that of at least 5 weight units of raw soy flour; whereby protein degradation in said dough product is materially reduced.

8. A farinaceous dough, and in combination therewith, a concentrate of an antiproteolytic aqueous soybean extract from which a protein fraction has been removed by precipitation at a pH between about 3.8 and about 5, said soybean extract being free from crude soybean fiber, and said extract being present in an amount, per 100 weight units of the flour component of said dough equivalent in antiproteolytic activity to that of at least 5 weight units of raw soy flour, the antiproteolytic activity of 1 gram of said concentrate on a dry weight basis being at least equal to the antiproteolytic activity of 1.5 grams of raw soy flour; whereby protein degradation in said dough product is materially reduced.

9. A farinaceous dough, and in combination therewith an antiproteolytic aqueous soybean extract from which a protein fraction has been removed by precipitation at a pH between about 3.8 and about 5, said soybean extract being free from crude soybean fiber, and said extract being present in an amount per 100 weight units of the flour component of said dough, equivalent in antiproteolytic activity to that of at least 5 weight units of said raw soy flour, whereby protein degradation in said dough is materially reduced.

10. The method according to claim 2, wherein the flour component of said farinaceous dough comprises a member of the group consisting of freshly milled (immature) flour, whole-wheat flour, wheat germ, and malted (sprouted) flour.

11. The method of retarding protein degradation in a heat-processed farinaceous food product made from a yeast-containing flour dough, comprising including in said dough, prior to baking, a concentrate of an antiproteolytic aqueous extract of a legume being a member of the group consisting of soya and phaseolus from which a protein fraction has been removed by precipitation at a pH between 3.8 and 5, said legume extract being free from crude legume fiber, and said concentrate being added in an amount, per 100 weight units of the flour component of said dough, equivalent in antiproteolytic activity to that of at least 5 weight units of raw soy flour.

12. A farinaceous food product comprising in combination with a flour dough, brewers' yeast and a concentrate of an antiproetolytic aqueous extract of a legume being a member of the group consisting of soya and phaseolus, from which a protein fraction has been removed by precipitation at a pH between 3.8 and 5, said legume extract being free from legume fiber, and said extract being present in an amount, per 100 weight units of the flour component of said dough, equivalent to that of at least 5 weight units of said raw soy flour, the antiproteolytic of 1 gram of said concentrate on a dry weight basis being at least equal to the antiproteolytic activity of 1.5 grams of raw soy flour; whereby protein degradation in said dough is materially reduced.

13. A farinaceous food product comprising in combination with a flour dough, active dry bakers' yeast and a concentrate of an antiproteolytic aqueous extract of a legume being a member of the group consisting of soya and phaseolus, from which a protein fraction has been removed by precipitation at a pH between 3.8 and 5, said legume extract being free from legume fiber, and said extract being present in an amount, per 100 weight units of the flour component of said dough, equivalent to that of at least 5 weight units of said raw soy flour, the antiproteolytic activity of 1 gram of said concentrate on a dry weight basis being at least equal to the antiproteolytic activity of 1.5 grams of raw soy flour; whereby protein degradation in said dough is materially reduced.

14. A farinaceous food product comprising, in combination with a flour dough, a member of the group consisting of freshly milled (immature) flour, whole-wheat flour, wheat germ, and malted (sprouted) flour, supplemented with an antiproteolytic aqueous extract of a legume being a member of the group consisting of soya and phaseolus, from which a protein fraction has been removed by precipitation at a pH between 3.8 and 5, said legume being free from crude legume fiber, said extract being present in an amount per 100 weight units of the flour component of said dough, equivalent in antiproteolytic activity to that of at least 5 weight units of raw soy flour, whereby protein degradation in a farinaceous food product prepared from said dough which includes said extract is materially reduced.

15. A farinaceous food product comprising in combination with a flour dough, a low-heat-processed milk product supplemented with an antiproteolytic aqueous extract of a legume being a member of the group consisting of soya and phaseolus, from which a protein fraction has been removed by precipitation at a pH between 3.8 and 5, said legume being free from crude legume fiber, said extract being present in an amount per 100 weight units of the flour component of said dough, equivalent in antiproteolytic activity to that of at least 5 weight units of raw soy flour, whereby protein degradation in a farinaceous food product prepared from said dough which includes said extract is materially reduced.

16. A farinaceous food product comprising in combination with a flour dough, yeast supplemented with an antiproteolytic aqueous extract of a legume being a member of the group consisting of soya and phaseolus, from which a protein fraction has been removed by precipitatiton at a pH between 3.8 and 5, said legume being free from crude legume fiber, said extract being present in an amount, per 100 weight units of the flour component of said dough, whereby equivalent in antiproteolytic activity to that of at least 5 weight units of raw soy flour, protein degradation in a farinaceous food product prepared from said dough which includes said extract is materially reduced.

17. A farinaceous food product comprising, in combination with a flour dough, a protein-rich dough adjunct, said protein-rich adjunct being a member of the group consisting of wheat germ, low-heat-processed milk product, brewers' yeast and active dry bakers' yeast, and supplemented with an antiproteolytic aqueous extract of a legume being a member of the group consisting of soya and phaseolus, from which a protein fraction has been removed by precipitation at a pH between about 3.8 and about 5, said legume extract being free from crude legume fiber, the amount of the antiproteolytic extract per 100 weight units of the flour component of said dough being equivalent in antiproteolytic activity to that of at least 5 weight units of raw soy flour whereby protein degradation in said farinaceous food product is materially reduced.

18. The method of retarding protein degradation in heat-processed farinaceous food made from a dough, comprising including in said dough, prior to final heat-processing, a protein-rich dough adjunct, said protein-rich adjunct being a member of the group consisting of wheat germ, low-heat-processed milk product, brewers' yeast and active dry bakers' yeast, and supplemented with an antiproteolytic aqueous extract of a legume being a member of the group consisting of soya and phaseolus, from which a protein fraction has been removed by precipitation at a pH between about 3.8 and about 5, said legume extract being free from crude legume fiber, the included quantity of said supplemented dough adjunct being sufficient to provide an amount of said antiproteolytic legume extract, per 100 weight units of the flour component of said dough, equivalent in antiproteolytic activity to that of at least 5 weight units of raw soy flour.

19. A baked farinaceous food product, comprising a baked dough, said dough containing an antiproteolytic aqueous extract of a legume being a member of the group consisting of soya and phaseolus, from which a protein fraction has been removed by precipitation at a pH between about 3.8 and about 5, said legume extract being free from crude legume fiber, and said extract being present in an amount, per 100 weight units of the flour component of said dough, equivalent in antiproteolytic activity to that of at least 5 weight units of raw soy flour; whereby protein degradation in said food product is materially reduced.

20. A baked farinaceous food product, comprising a baked dough, said dough containing an antiproteolytic aqueous soybean extract from which a protein fraction has been removed by precipitation at a pH between about 3.8 and about 5, said soybean extract being free from crude soybean fiber, and said extract being present in an amount per 100 weight units of the flour component of said dough, equivalent in antiproteolytic activity to that of at least 5 weight units of said raw soy flour, whereby protein degradation in said food product is materially reduced.

DANIEL MELNICK.

References Cited in the file of this patent

UNITED STATES PATENTS

| Number | Name | Date |
| --- | --- | --- |
| 595,296 | Fromm et al. | Dec. 14, 1897 |
| 1,957,336 | Haas et al. | May 1, 1934 |
| 2,138,962 | Hewitt | Nov. 29, 1938 |
| 2,262,138 | Frey | Nov. 11, 1941 |
| 2,326,278 | Baker | Aug. 10, 1943 |

OTHER REFERENCES

Tauber, Chemistry and Technology of Enzymes, John Wiley and Sons, 1949, page 149.